(12) United States Patent
Barnum et al.

(10) Patent No.: US 7,272,692 B2
(45) Date of Patent: Sep. 18, 2007

(54) ARBITRATION SCHEME FOR MEMORY COMMAND SELECTORS

(75) Inventors: Melissa Ann Barnum, Kasson, MN (US); Kent Harold Haselhorst, Byron, MN (US); Lonny Lambrecht, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 10/988,311

(22) Filed: Nov. 12, 2004

(65) Prior Publication Data

US 2006/0107001 A1    May 18, 2006

(51) Int. Cl.
*G06F 12/00* (2006.01)
(52) U.S. Cl. .................. 711/158; 711/154; 710/5; 710/6; 710/240; 710/244
(58) Field of Classification Search ............ None
See application file for complete search history.

(56) References Cited

U.S. PATENT DOCUMENTS

| | | | |
|---|---|---|---|
| 6,092,158 A * | 7/2000 | Harriman et al. ........... 711/151 |
| 6,101,614 A * | 8/2000 | Gonzales et al. ............. 714/6 |
| 6,112,265 A * | 8/2000 | Harriman et al. ............. 710/40 |
| 6,182,177 B1 * | 1/2001 | Harriman .................... 710/112 |
| 6,671,761 B2 * | 12/2003 | Kim .......................... 710/244 |
| 2003/0229755 A1 * | 12/2003 | Espeseth et al. ............ 711/112 |
| 2004/0004883 A1 * | 1/2004 | Yagishita et al. ........... 365/222 |
| 2005/0105372 A1 * | 5/2005 | Kanda .................... 365/230.06 |

\* cited by examiner

*Primary Examiner*—Jasmine Song
(74) *Attorney, Agent, or Firm*—Stephen J. Walder, Jr.; Francis Lammes; D'Ann N. Rifal

(57) ABSTRACT

An arbitration structure, a method, and a computer program are provided for an arbitration scheme that can handle a plurality of memory commands in an operating system. Typically, in a memory system there are three types of memory commands: periodic, read, and write. An arbitration scheme determines the order of priority in which these commands are executed. This arbitration scheme is flexible because it contains a read/write priority module, which can be programmed to execute any order of priority combination of read and write commands. This enables an arbitration scheme for any memory system to be easily programmed for maximum efficiency.

19 Claims, 2 Drawing Sheets

ARBITRATION SCHEME FOR MEMORY COMMAND SELECTORS

FIELD OF THE INVENTION

The present invention relates generally to a memory command arbiter, and more particularly, to a memory control arbiter that can handle different memory devices at high bandwidths with low read latency.

DESCRIPTION OF THE RELATED ART

An arbitration scheme for memory commands can be described as a hierarchy that determines which memory command has immediate priority to use a specific data channel. Typically, memory systems are managed by a group of commands that accomplish the necessary operations of the memory system. These operations consist of read, write, and periodic commands. Read commands receive data from memory cells in response to a request for that data. Write commands transmit data to memory cells to be stored. Periodic commands consist of a memory refresh or a memory scrub, which must be executed within a certain time window. A memory refresh command maintains the current value of the memory cells. If a cell is not refreshed in a specific amount of time, the data becomes unstable. A memory scrub command reads the data from the memory cells to check for data errors. If there is a single bit error, the error is fixed and the data is stored back into memory.

Arbitration schemes determine the order in which these commands are accomplished by the memory system. In every memory system there is a limited amount of data bandwidth that can be used to accomplish the necessary memory commands. The read, write and periodic commands request to gain ownership of a data channel, and the arbiter grants ownership of the specific channel to the chosen command. The order in which the commands are chosen for each memory subsystem is unique. Some subsystems have a larger delay when switching between different types of commands. In a system where there is a large delay, the arbiter wants to select the same type of command for as long as it can before transferring to a different command. In a system where there is no delay, the arbiter has more freedom to choose the command based on how full its queues are or to choose multiple read commands to reduce read latency.

The problem is that conventional arbitration schemes are not flexible. Conventional arbitration schemes are not robust enough to handle a wide range of memory devices and memory systems. The conventional arbitration schemes must be hard coded to match the memory system they are designed with. Different memory systems need to be configured with unique arbitration schemes, which means that implementation is not easy or efficient. It is clear that a modified arbitration scheme is needed to provide more flexibility with implementation and to make memory systems more efficient.

SUMMARY OF THE INVENTION

The present invention provides an arbitration structure, a method, and a computer program for an arbitration scheme that can handle a plurality of memory commands in an operating system. Typically, in a memory system there are three types of operations: periodic, read, and write. These operations are accomplished by issuing commands that correspond to the particular operations. An arbitration scheme determines the order of priority in which these commands are executed. This arbitration scheme is flexible because it contains a read/write priority module. The read/write priority module can be programmed to execute any order of priority combination of read and write commands. This enables an arbitration scheme for any memory system to be easily programmed so that the memory commands are executed efficiently. By maximizing efficiency, this invention allows memory systems to operate at high bandwidths with a low read latency.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in block diagram or flow chart form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

When designing an arbitration scheme for memory command selection, there are a couple of features to be concerned with. Maximum bandwidth and minimum read latency must be realized in these designs. To achieve maximum bandwidth, the memory system should be able to handle a high amount of data traffic without any dead time. To achieve minimum read latency, the memory system should be able to accomplish read and write operations in the shortest period of time possible. Read latency can be negatively affected by read operation cycle time and read to write or write to read turnaround delays.

Figure 1:
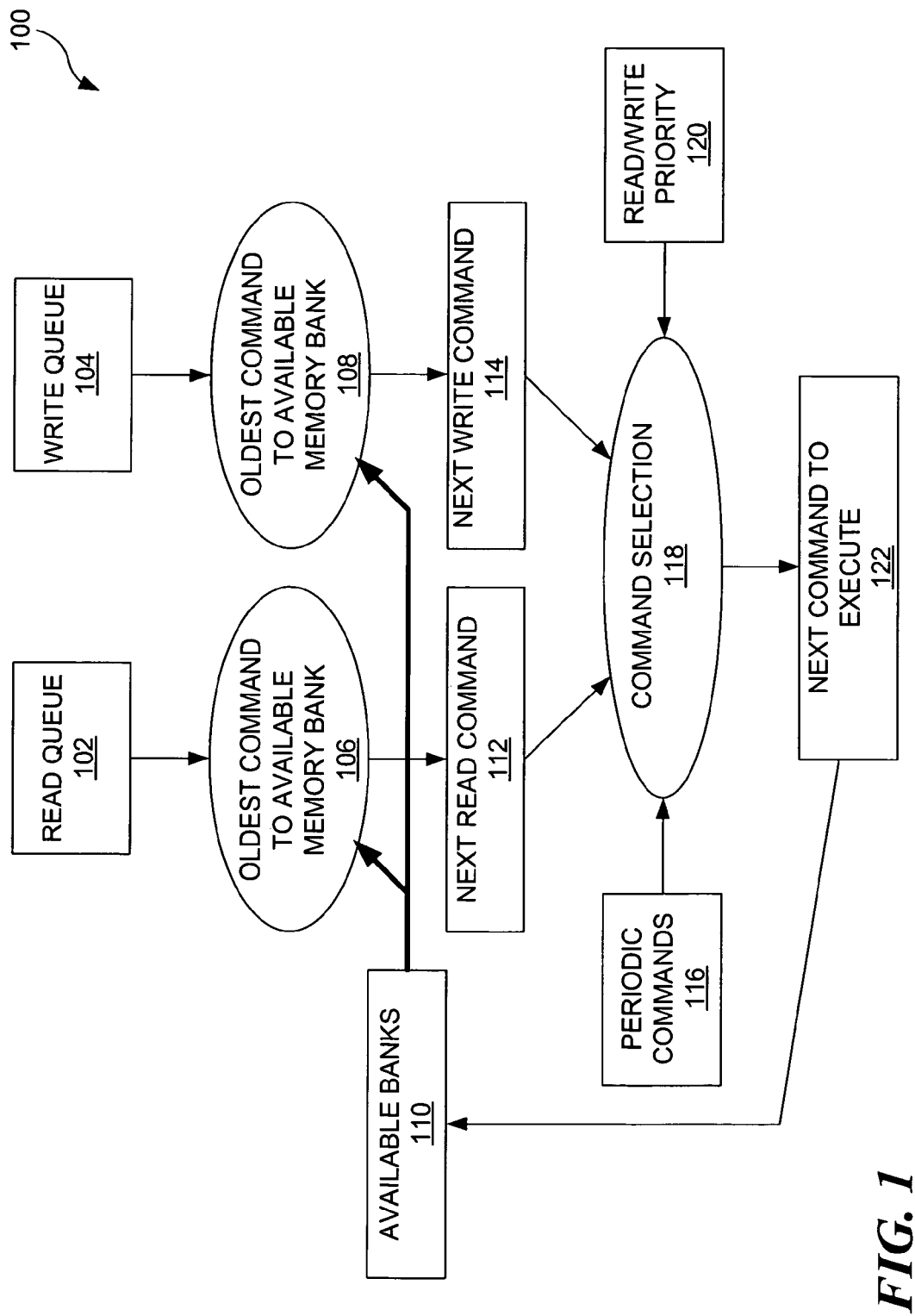
FIG. 1 is a flow chart illustrating a modified multiple stage arbitration scheme for use in a memory controller.

Referring to FIG. 1 of the drawings, reference numeral 100 is a flow chart illustrating a modified multiple stage arbitration scheme for use in a memory controller. There are three types of commands that this arbitration scheme controls: read, write and periodic commands. The periodic commands consist of a memory refresh or a memory scrub. The arbitration scheme 100 contains two stages. The first stage consists of preparing a read or write operation to be executed from the read 102 or write queues 104. The second stage involves the selection of the highest-priority command and the execution of that command. Read queue 102 signifies a stack of read operations that need to be executed. Write queue 104 signifies a stack of write operations that need to be executed. The commands for the read 102 and the write queues 104 are arbitrated individually in the first stage. The oldest command to an available memory bank step 106 depicts that the oldest read operation in the read queue 102 is selected by the arbiter first. The oldest command to available memory bank step 108 depicts that the oldest write operation in the write queue 104 is selected by the arbiter first. These steps 106 and 108 are shown because the arbiter must first select the commands that have been waiting to be executed the longest. At steps 106 and 108, the oldest commands are paired with an available bank 110 from the bank sequencer pool. The available banks 110 step refers to the bank sequencers that are idle and can be used to execute an operation.

The next read command 112 signifies that the oldest read command 106 is paired with an available bank 110 and the read operation is ready to be executed. The next write command 114 signifies that the oldest write command 108 is paired with an available bank 110 and the write operation is ready to be executed. The command selection stage 118 is the core of the arbitration scheme. This is where the specific commands (read, write or periodic) are selected to be executed 122. The periodic commands 116, the next read command 112, the next write command 114, and the read/write priority 120 are all provided to the command selection 118.

Periodic commands 116 must be executed within a certain time window, so they 116 are chosen ahead of read 112 and write commands 114 at the command selection stage 118. The read/write priority 120 determines the priority order of the read 112 and write commands 114. The read/write priority 120 can be programmed to execute any combination of read 112 and write commands 114, which means that it can be configured to any memory system's specifications. When the highest-priority command is selected 118, that command is then executed 122. After the command is executed the bank that executed the command is unavailable for a configurable amount of time. After this period of time the bank becomes available 110 and it may be used for another operation. During that delay time, all the other banks may be used to execute commands. Accordingly, the new available bank 110 is then ready to execute the oldest read command 106 or the oldest write command 108. In one embodiment of this arbitration scheme, the memory system contains eight banks, and four banks are the most that can be in use at any one time.

This arbitration scheme design 100 provides many advantages over previous arbitration schemes. The read/write priority 120 is core concept of this modified arbitration scheme 100. The read/write priority 120 is configurable based upon the memory device specifications. If the memory device has a large turnaround delay from reads to writes, or from writes to reads, the read/write priority 120 can be set up to influence the command selection 118 to choose commands of the same type. For example, the read/write priority 120 can be programmed to do 16 read commands 112 in a row. This causes the write commands to pile up at the write queue 104, so that you can send a large group of write commands 114 in a row. In this example there is only one read to write turnaround and one write to read turnaround for every 16 read commands, which indicates that the memory commands are executed more efficiently. This feature of the arbitration scheme 100 allows for maximum bandwidth because there is a drastic decrease in down time that is caused by turnaround delays. This feature also minimizes read latency because reads can be executed more quickly without turnaround delays.

Another advantage of this arbitration scheme 100 is its flexibility. The programmability of the read/write priority 120 ensures that this arbitration scheme can be implemented to achieve maximum efficiency from any memory system. The read/write priority 120 is programmed by setting a few registers to the desired specifications. Conventional arbitration schemes are not easily programmed, and therefore, a new chip is required to be entirely configured for each specific memory system. Overall, this arbitration scheme 100 provides a flexible, fast, and efficient solution to memory command selection.

Figure 2:
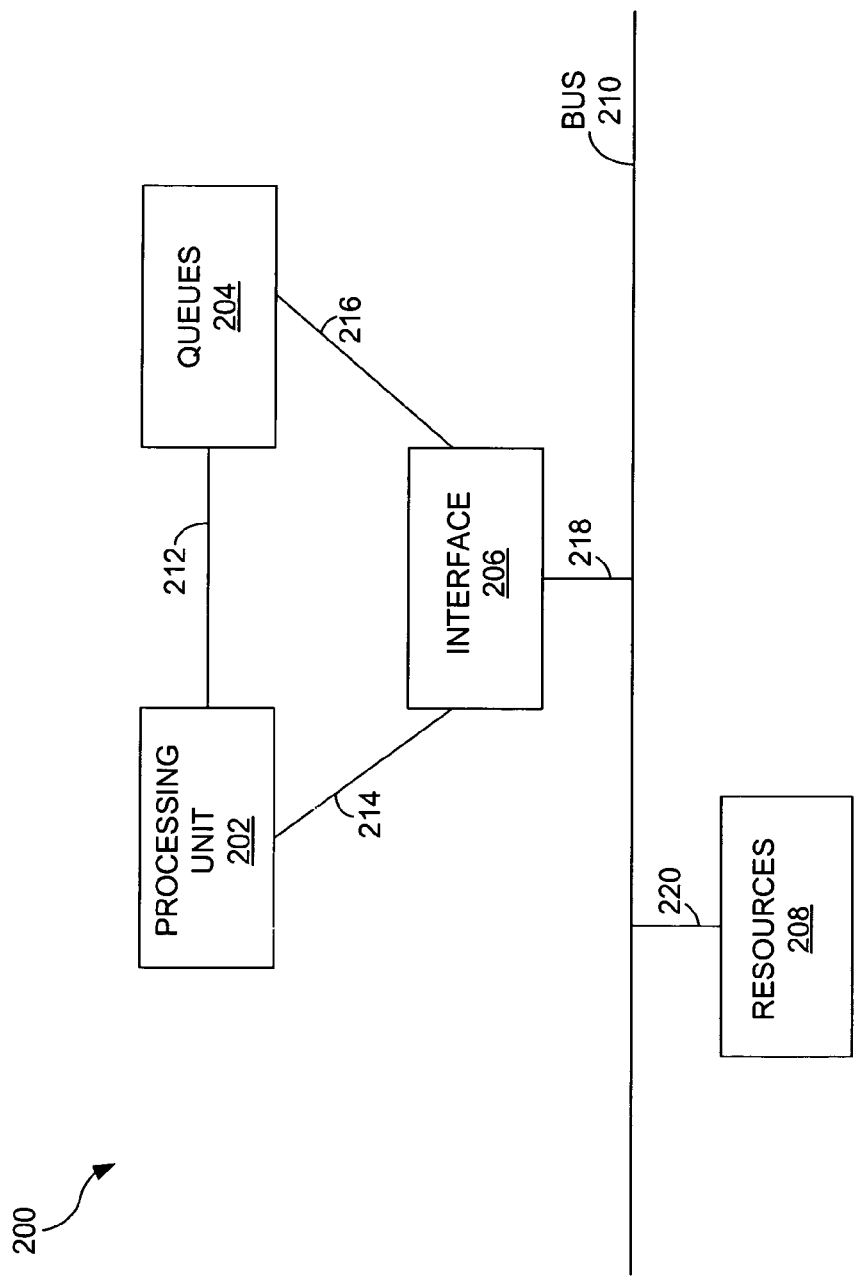
FIG. 2 is a block diagram illustrating an apparatus designed for a multiple stage arbitration scheme for use in a memory controller.

Referring to FIG. 2 of the drawings, reference numeral 200 is a block diagram illustrating an apparatus designed for a multiple stage arbitration scheme for use in a memory controller. A processing unit 202 is the module that accomplishes the logical functions of the memory system. The communication channel 212 connects the processing unit 202 to queues 204. The queues 204 is a storage module that assembles a line of operations (read and write operations) to be carried out. Accordingly, the processing unit 202 determines what operations need to be accomplished and transmits these operations on the communication channel 212 to be stored by the queues 204. Communication channel 214 connects the processing unit 202 to an interface 206. The interface module 206 selects the commands (read, write, or periodic) that are to be executed. The processing unit 202 controls the periodic commands 116 (FIG. 1), so if a periodic command must be accomplished then it is transmitted to the interface 206 on communication channel 214. The queues 204 are connected to the interface 206 by communication channel 216. The queues 204 transmit the next commands (read or write) to be executed by the interface 206 over communication channel 216.

The interface module 206 is connected to a bus 210 by connection channel 218. The resources (banks) 208 are connected to the same bus 210 by connection channel 220. The interface module 206 provides the next command to be executed (read, write, or periodic) and the resources (banks) 208 provide an available bank to accomplish the command. The bus 210 is used to execute the command and transmit the resulting data. FIG. 2 illustrates only one embodiment of an apparatus that can be configured to accomplish this multiple stage arbitration scheme.

It is understood that the present invention can take many forms and embodiments. Accordingly, several variations of the present design may be made without departing from the scope of the invention. The capabilities outlined herein allow for the possibility of a variety of programming models. This disclosure should not be read as preferring any particular programming model, but is instead directed to the underlying concepts on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An arbitration structure for handling differing types of memory commands in an operating system, comprising:
    a module for preparing at least one of a plurality of read commands to be executed;
    a module for preparing at least one of a plurality of write commands to be executed;

a module for preparing at least one of a plurality of periodic commands to be executed;
a module for pairing an oldest read command of the plurality of read commands or an oldest write command of the plurality of write commands with an available bank of a plurality of banks;
a read/write priority module for determining a priority order for the plurality of read commands and the plurality of write commands;
a command selection module for selecting the next command to be executed out of a plurality of commands (read, write, and periodic) as a function of the priority order; and
a memory controller for executing the memory commands as a function of the command selection module.

2. The arbitration structure of claim 1, wherein the module for preparing the read commands, further comprises:
a read queue for stacking the plurality of read commands.

3. The arbitration structure of claim 1, wherein the module for preparing the write commands, further comprises:
a write queue for stacking the plurality of write commands.

4. The arbitration structure of claim 1, wherein the module for preparing at least one of a plurality of periodic commands to be executed, further comprises:
a module for preparing at least one of a plurality of memory refresh commands; and
a module for preparing at least one of a plurality of memory scrub commands.

5. The arbitration structure of claim 1, wherein the read/write priority module for determining the priority order for the plurality of read commands and for the plurality of write commands, further comprises the read/write priority module programmed to employ the priority order consisting of any combination of the plurality of read commands and the plurality of write commands.

6. The arbitration structure of claim 1, wherein the command selection module for selecting the next command to be executed out of a plurality of commands as a function of the read/write priority module, further comprises a command selection module that is at least configured to accept inputs from the read command module, the write command module, the periodic command module, and the read/write priority module.

7. The arbitration structure of claim 6, wherein the command selection module, further comprises the command selection module selecting a prepared periodic command before a prepared read command or a prepared write command.

8. A method for handling differing types of memory commands in an operating system, comprising:
preparing at least one of a plurality of read commands to be executed;
preparing at least one of a plurality of write commands to be executed;
preparing at least one of a plurality of periodic commands to be executed;
pairing an oldest read command of the plurality of read commands or an oldest write command of the plurality of write commands with an available bank of a plurality of banks;
determining a priority order for the plurality of read commands and the plurality of write commands;
selecting the next command of a plurality of commands (read, write, and periodic) to be executed, as a function of the priority order; and
executing the memory commands as a function of the selected command.

9. The method of claim 8, wherein preparing at least one of a plurality of read commands to be executed, further comprises:
stacking the plurality of read commands; and
preparing the oldest read command to be executed.

10. The method of claim 8, wherein preparing at least one of a plurality of write commands to be executed, further comprises:
stacking the plurality of write commands; and
preparing the oldest write command to be executed.

11. The method of claim 8, wherein preparing at least one of a plurality of periodic commands to be executed, further comprises:
preparing at least one of a plurality of memory refresh commands to be executed; and
preparing at least one of a plurality of memory scrub commands to be executed.

12. The method of claim 8, wherein determining a priority order for the plurality of read commands and the plurality of write commands, further comprises:
designing a priority order that allows the memory system to execute commands efficiently; and
programming a read/write priority module to implement the priority order.

13. The method of claim 8, wherein selecting the next command of a plurality of commands to be executed, as a function of the priority order, further comprises selecting a prepared periodic command before a prepared read command and a prepared write command.

14. A computer program product for handling differing types of memory commands in an operating system, with the computer program product having a medium with a computer program embodied thereon, wherein the computer program comprises:
computer code for preparing at least one of a plurality of read commands to be executed;
computer code for preparing at least one of a plurality of write commands to be executed;
computer code for preparing at least one of a plurality of periodic commands to be executed;
computer code for pairing an oldest read command of the plurality of read commands or an oldest write command of the plurality of write commands with an available bank of a plurality of banks;
computer code for determining a priority order for the plurality of read commands and the plurality of write commands;
computer code for selecting the next command of a plurality of commands (read, write, and periodic) to be executed, as a function of the priority order; and
computer code for executing the memory commands as a function of the selected command.

15. The computer program product of claim 14, wherein the computer code for preparing at least one of a plurality of read commands to be executed, further comprises:
computer code for stacking the plurality of read commands; and
computer code for preparing the oldest read command to be executed.

16. The computer program product of claim 14, wherein the computer code for preparing at least one of a plurality of write commands to be executed, further comprises:
computer code for stacking the plurality of write commands; and computer code for preparing the oldest write command to be executed.

17. The computer program product of claim 14, wherein the computer code for preparing at least one of a plurality of periodic commands to be executed, further comprises:
   computer code for preparing at least one of a plurality of memory refresh commands to be executed; and
   computer code for preparing at least one of a plurality of memory scrub commands to be executed.

18. The computer program product of claim 14, wherein the computer code for determining a priority order for the plurality of read commands and the plurality of write commands, further comprises:

computer code for designing a priority order that allows the memory system to execute commands efficiently; and computer code for programming a read/write priority module to implement the priority order.

19. The computer program product of claim 14, wherein the computer code for selecting the next command of a plurality of commands to be executed, as a function of the priority order, further comprises selecting a prepared periodic command before a prepared read command and a prepared write command.

* * * * *